United States Patent

[11] 3,533,500

[72] Inventors Martin Mayrath
10707 Lennox, Dallas, Texas 75229;
[21] Appl. No. 721,373
[22] Filed April 15, 1968
[45] Patented Oct. 13, 1970
[73] Assignee Ruth Long Mayrath, administratrix of the estate of Martin M. Mayrath, deceased

[54] AUGER CONVEYOR WITH DRIVE BELT TAKE UP MEANS
3 Claims, 8 Drawing Figs.

[52] U.S. Cl. .................................................. 198/213;
74/242; 198/233
[51] Int. Cl. .................................................. B65g 33/00
[50] Field of Search .......................................... 198/233,
213, 208; 74/242.14, 242.11

[56] References Cited
UNITED STATES PATENTS
2,551,147  5/1951  Mayrath ..................... 198/233
2,664,757  12/1954  Shaw ......................... 74/242.14
3,179,242  4/1965  Mayrath ..................... 198/233

Primary Examiner—Richard E. Aegerter
Attorney—Homer R. Montague

ABSTRACT: An elongated auger conveyor is driven from the upper or discharge end thereof through a series of highly tensioned nylon, Dacron, polyester, or rayon belts and pulleys, the lowermost pully toward the inlet end of the conveyor being the driving pully, and at least such driving pulley being mounted to bodily move to take up stretch and slack in the belts and prevent their breakage, the latter pulley being moved to tension the belts solely by resiliently applied force.

Patented Oct. 13, 1970
3,533,500
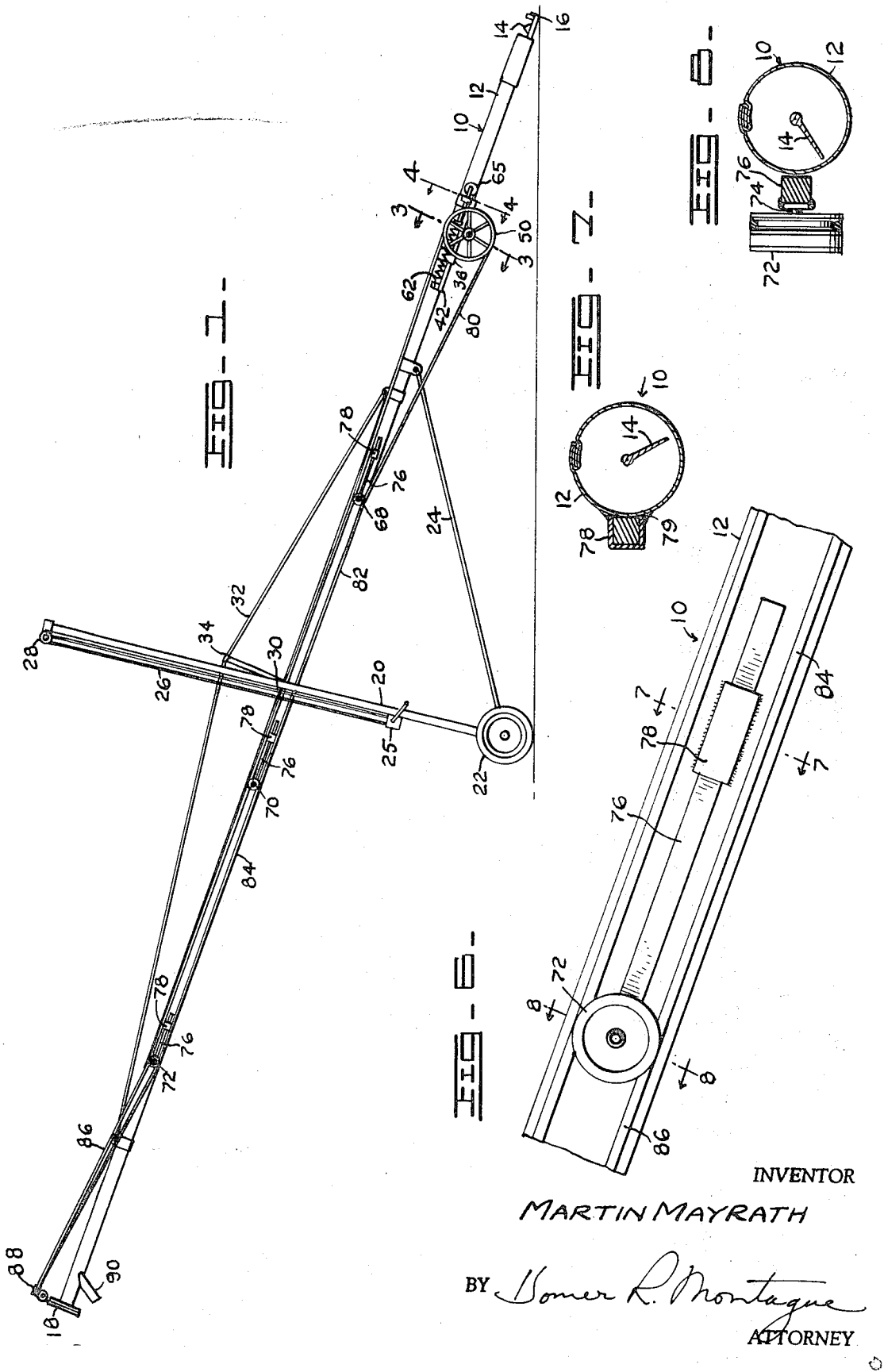
INVENTOR
MARTIN MAYRATH
BY Homer R. Montague
ATTORNEY

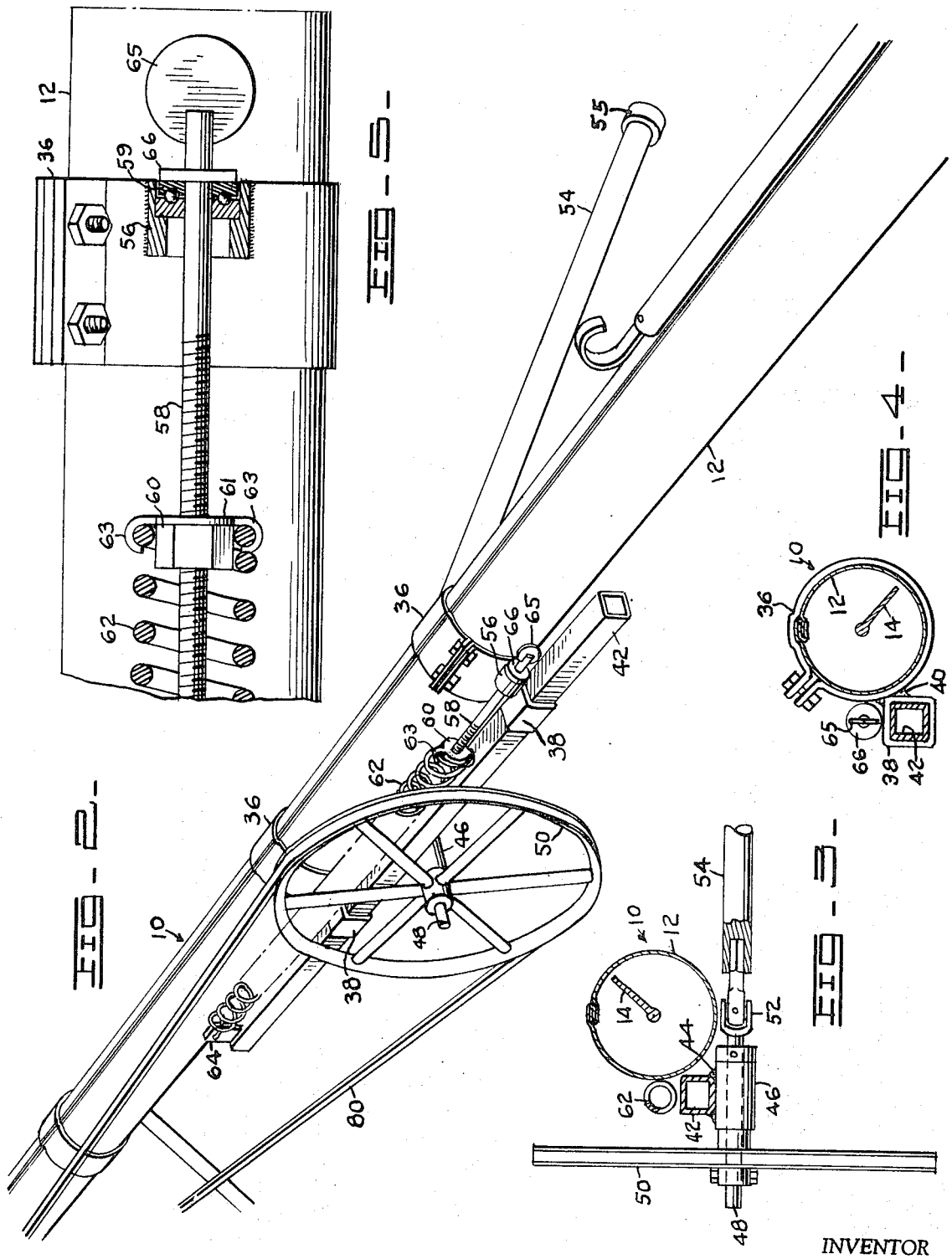

3,533,500

1

AUGER CONVEYOR WITH DRIVE BELT TAKE UP MEANS

BACKGROUND OF THE INVENTION

The invention is particularly related to the art of farm conveyors of the auger type. Usually a prime mover is supported relative to the conveyor tube and connected by a series of belts and pulleys to an auger driving pulley at the upper end of the conveyor. The prime mover is mounted to be moved to adjusted positions to tension the belt connected to the pulley thereof. Because of the susbtantial distance between the drive means and the upper end of the conveyor, it is impracticable to use a single belt to drive the pulley at the upper end of the auger. For example, 3 percent stretch in a total belt length of 80 feet would represent about 30 inches of slack to be taken up at one pulley position. For this reason, intermediate dual pulleys are spaced along the conveyor and successive such pulleys are connected by separate belts to transmit the driving force. The intermediate pulleys are preferably mounted to adjust themselves according to the adjustment of the drive means so that all of the belts are equally tensioned. Such conveyor mechanisms are shown in prior patents to Robert L. Mayrath, U.S. Pat. No. 2,673,639, granted Mar. 30, 1954, Leon C. Wilcoxen, U.S. Pat. No. 2,746,592, granted May 22, 1956, and my prior patent U.S. Pat. No. 3,208,581, granted Sept. 28, 1965. Prior art mechanisms of the type described are highly practicable, but possess one disadvantage. The undue stretching of the belts requires that the mechanism be shut down, and the bolts which fix the power input means in position must be loosened. Such means is then moved to properly tension the belts, whereupon the bolts are tightened and the apparatus returned to operation. Also, it is desirable to permit momentary overloads without belt breakage.

SUMMARY OF THE INVENTION

The present invention is particularly adapted for use with a driving pulley connected to the power take-off means of a suitable tractor or the like. The driving pulley is near the lower or input end of the conveyor while the driven pulley is fixed to the upper end of the auger shaft. Intermediate spaced dual pulleys transmit power through belts from the drive pulley to the driven pulley. The driving pulley is fixed in a novel manner with respect to the auger tube to move longitudinally thereof, and has novel means for automatically taking up slack in the belts without shutting down the operation of the apparatus. This novel means resides in the provision of a loaded spring exerting a constant force tending to move the longitudinally slidable mounting of the driving pulley over a considerable travel distance toward the inlet end of the conveyor so that slack in the belts is always automatically taken up. The loading of the automatic take-up spring is readily adjustable to determine the force applied to the mounting of the driving pulley to take up the slack in the belts. A belt tension value of 400 pounds is fairly typical for such service, but power will be transmitted even at much lower values.

BRIEF DESCRIPTION OF THE DRAWING

FIG. 1 is a side elevation of an auger conveyor embodying the apparatus;

FIG. 2 is an enlarged fragmentary perspective view showing the driving pulley and its mounting with respect to the conveyor tube;

FIG. 3 is an enlarged transverse section on line 3–3 of FIG. 1;

FIG. 4 is a similar view on line 4–4 of FIG. 1;

FIG. 5 is an enlarged side view, partly in central section, of a portion of FIG. 2;

FIG. 6 is an enlarged fragmentary side elevation showing the mounting of one of the intermediate dual pulleys relative to the conveyor tube;

FIG. 7 is a detail section on line 7–7 of FIG. 6; and

FIG. 8 is a similar view on line 8–8 of FIG. 6.

2

DESCRIPTION OF THE PREFERRED EMBODIMENT

Referring to the drawings, the numeral 10 designates an auger conveyor as a whole, and which may be 40 feet long or even longer, comprising the usual elongated tube 12 in which is arranged a conventional auger screw 14 for conveying grain or other like material through the tube 12. The lower end of the auger may have its shaft supported in a bearing 16, the lower end of the conveyor tube being open to receive granular or similar material to be fed into the lower end of the conveyor. The upper end of the shaft of the auger has mounted thereon a driven pulley 18, and the present invention is related primarily to a means for driving such pulley, as described below.

Intermediate its ends the conveyor is supported by a post 20 having wheels 22 at its lower end, the axle of which is braced as at 24 relative to the conveyor tube. A conventional winch 25 is provided with a cable 26 passing over an upper pulley 28 and downwardly for connection as at 30 with the conveyor tube to adjust the height of the conveyor tube intermediate its ends and thus adjust the angularity of the conveyor. Guys 32, connected to an upstanding post 34, brace the relatively long tube 12, as will be understood.

Toward the lower end of the conveyor, a pair of split or divided clamps 36 (see FIG. 2) surround the tube 12 and each carries a polygonal and preferably rectangular guide 38 welded as at 40 (FIG. 4) to the clamp and in which is slidable a square tubular member 42 having welded thereto as at 44 a bearing 46 supporting a shaft 48 carrying a pulley 50. Beneath the tube 12, the shaft 48 is connected by a universal joint 52 to a power input shaft 54, having a head 55 (FIG. 2) at its free end adapted for connection with the driving shaft of a power source, power take-off, engine, or the like.

The member 42 is biased to move toward the lower or inlet end of the conveyor, and this biasing means may be in the form of either a tension or compression spring, which spring is maintained loaded, as will become apparent. In the drawings, a tension spring is shown for providing the resilient force. Referring to FIG. 2, a sleeve 56 is welded to the adjacent clamp 36 and guide 38 for rotatably supporting a threaded rod 58 of substantial length. The threaded end of this rod connects to the end of, and extends within a tension spring 62 and the upper end of this spring is connected to an ear 64 welded or otherwise secured to the upper end of the member 42. A flange 66 on the rod 58 has engagement with a thrust bearing 59 carried by the sleeve 56. A nut 60 is threaded on the rod 58 and a clip 61 is welded to the nut 60 and has projections 63 hooked around the adjacent coil of the spring 62. A disc or the like 65 is carried by the rod 58 and forms a handle to turn the rod 58 in the nut 60 to tension the spring 62. It will be obvious that with this spring loaded, a resilient force will be applied to the upper end of the member 42 to tend to slide it longitudinally in its guides toward the lower end of the tube 12.

Between the driving pulley 50 and driven pulley 18 (FIG. 1) are arranged a plurality of dual pulleys 68, 70 and 72. One set of such pulleys, for example, the pulley 72, is shown in FIGS. 6 and 8. Each dual pulley is provided with two grooves and each is mounted on a shaft 74 fixed to a bar 76 lying adjacent and parallel to the tube 12. Each bar 76 is shown as being slidable in an elongated guide 78 (FIG. 7) welded as at 79 to the tube 12. Thus, it will be apparent that each dual pulley is mounted for sliding movement longitudinally of the conveyor tube. This means for movably supporting the dual pulleys is merely illustrative, and any other supporting means for this purpose may be employed, such as the means shown in prior U.S. Pat. Nos. 2,673,639 and 3,208,581, identified above.

A belt 80 (FIG. 1) passes around the driving pulley 50 and around one of the grooves of the dual pulley 68. A second belt 82 passes around the second groove of the pulley 68 and around one of the grooves of the pulley 70. The second groove of the latter pulley is engaged by a belt 84 which passes around one of the grooves of the pulley 72, while the second groove of the latter pulley is connected by a belt 86 to the driven pulley 18 through suitable conventional pulleys 88. The driving means described will drive the auger of the conveyor to feed material from the lower end of the conveyor to the upper end thereof to be discharged through a conventional spout at the point of desired material discharge.

While not limited to use therewith, the present invention is highly effective for use with nylon belting which stretches substantially in the first few minutes of use. With the spring 62 properly loaded, it is not necessary to loosen any nuts, bolts, or fastening means to take up slack, the pulley 50 moving automatically to tension the belt as stretching occurs. There will typically be approximately a 3 percent stretch with such belts, which is easily taken up by the spring 62. After the belt stretches, the handle 65 may be turned to again increase the loading of the spring 62, if desired. Other belts, such as rayon belts, will continue to stretch over substantial periods of times and resilient force provided by the spring 62 will automatically take up whatever stretching occurs. Obviously, it is never necessary to shut down the operation of the apparatus to take up the stretching of the belt.

With the employment of power take-off drive means of the type described, no belt clutching arrangement is provided, and even when relatively slack the belts will pull the load. Broadly, however, the invention is also applicable to engine drives. It is also pointed out that the spring will collapse to some extent under short overloads which sometime occur in conveyors of this kind and thus the spring acts as a shock absorber to prevent belt breakage. Accordingly, the mechanism is highly efficient in operation and requires no adjusting in tension whatever except possibly for the turning of the rod 58 to move nut 60 if the spring tension at any time is reduced below the desired point for properly maintaining the desired tensioning of the belts.

If belts 82, 84 and 86 are used which have been substantially stretched, it is not necessary to provide means for mounting the dual pulleys for movement longitudinally of the conveyor. It is preferable, however, that some means be employed so that the dual pulleys may move as described, under which conditions the spring force is applied to all of the belts to maintain them under desired tension.

It is claimed:

1. In an auger conveyor of substantial length, a driven pulley connected to the auger adjacent the outlet end of the conveyor, a driving pulley adjacent the inlet end of the conveyor, at least one dual pulley intermediate said driving and driven pulleys and supported with respect to the conveyor for movement longitudinally thereof, belting connecting the various pulleys to transmit power from said driving pulley to said driven pulley, supporting members attached to said conveyor, spaced guide members carried by said supporting members, an elongated member slidable in said guide members, a bearing fixed to said elongated member, and a shaft mounted in said bearing and on which said driving pulley is mounted, means for applying resilient force connected at one end to said elongated member and having connection at its other end with one of said guide members to urge said elongated member and said driving pulley resiliently toward the inlet end of the conveyor to tension said belting.

2. An auger conveyor according to claim 1 provided with means for adjustably connecting said other end of said means for applying said resilient force to said one of said guide members to adjust the loading of said last-mentioned means.

3. An auger conveyor according to claim 1 wherein the means for connecting the other end of said means for applying said resilient force to said one guide member comprises an elongated threaded rod connected to said other end of said last-mentioned means, a sleeve fixed to said one guide member and in which said rod is rotatable, and a member threaded on said rod and connected to said other end of said means for applying said resilient force whereby said rod may be turned to adjust the loading of said last-mentioned means.